M. E. BROOKE.
ELASTIC TIRE ATTACHING MEANS FOR USE ON WHEELS OF BICYCLES, MOTOR CYCLES, AUTOMOBILES, AND FLYING MACHINES.
APPLICATION FILED MAR. 14, 1912. RENEWED SEPT. 28, 1914.
1,117,318.
Patented Nov. 17, 1914.
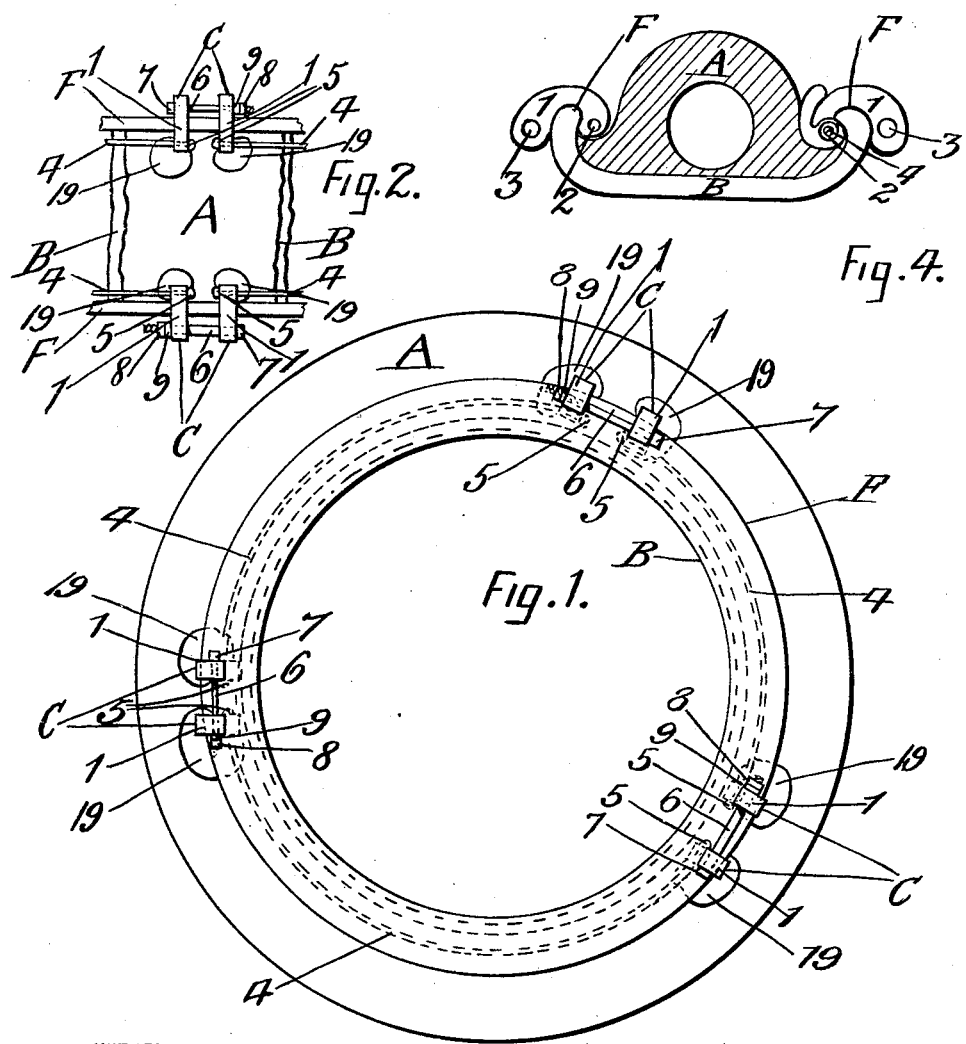

UNITED STATES PATENT OFFICE.

MARY EDITH BROOKE, OF DENVER, COLORADO.

ELASTIC-TIRE-ATTACHING MEANS FOR USE ON WHEELS OF BICYCLES, MOTOR-CYCLES, AUTOMOBILES, AND FLYING-MACHINES.

1,117,318. Specification of Letters Patent. Patented Nov. 17, 1914.

Application filed March 14, 1912, Serial No. 683,720. Renewed September 28, 1914. Serial No. 864,002.

*To all whom it may concern:*

Be it known that I, MARY EDITH BROOKE, residing at Denver, in the county of Denver and State of Colorado, have invented new and useful Elastic Tire-Attaching Means for use on Wheels of Bicycles, Motor-Cycles, Automobiles, and Flying-Machines, of which the following is a specification.

My invention relates to improvements in fastening tires in the channel of a wheel rim, and the object of my improvement is to provide, first, a fastening device whereby the tire can be secured on the rim or removed therefrom with greater ease; second, whereby a tire already fastened on a rim can be additionally secured thereto; third, whereby a deflated tire can be held in the rim of a moving machine; and, fourth, to provide a simple, inexpensive means of attaching a tire to any channel rim of a wheel. I attain these objects by the mechanism illustrated in the accompanying drawing, in which—

Figure 1 is a side view of a tire and rim with my attachment means applied thereto. Fig. 2 is a sectional piece of same showing the attachment means in place. Fig. 3 is a view of attachment means removed from wheel. Fig. 4 is a cross section through tire A and rim B and shows portion of attachment means in place.

Similar letters refer to similar parts throughout the several views.

My improved tire attaching means comprises essentially one or more pairs C of movable clamp arms 1 formed to embrace the side flange F of a wheel rim B and these arms 1 are moved along the outer periphery of the side flange F, and they are drawn together by threaded bolts 6 passed through holes 3 in the arms 1 on the outside of the flange F and are drawn apart by rods or wires 4 passed through holes 2 in the arms 1 on the inside of the flange F by means of heads 5 on the ends of these rods or wires, the heads 5 being located between each pair of arms C and the bolt heads 7 and bolt nut 8 and washer 9, being located on the outside of each pair of arms on the outside of the flange and the bolt passing through each pair of arms. The wires or rods 4 are curved within the wheel flange and rest in or on each side of the tire.

My attachment means is applied to the flange in circular form and of sufficient size for the rods 4 to be laid within the flange upon or within the side of the tire, and a space is allowed between each pair C of arms 1 and opposite rod heads 5 and the bolts loosely connecting up each pair of arms. When thus in place the bolts are tightened, drawing together each pair of arms, thus drawing on the wires or rods 4 thus decreasing the diameter within the wires.

I construct my attachment means of dimension to permit of a space existing between the pairs of arms C and the opposite rod heads for the further tightening at pleasure of my attaching means. I employ the bolts and nuts of commerce with spring lock washers adjoining the nuts to prevent them from working loose, or I key the bolts in any approved manner.

The action of my tire attaching means when the bolts are tightened results in the decreasing of the circumference of the circle in which the wires or rods work, thus drawing them down into the sides of the tire and toward the channel of the rim, resulting in the tightening of the tire in the rim channel.

To protect the tire from friction with the arms 1 I thread the wire or rod 4 through one end of a fabric and rubber pad 19 and place the pad between the arms and the tire.

Having thus described my invention, I claim:

1. A combination of a tire attaching means consisting of a series of pairs of movable clamp arms embracing the side flange of a wheel rim, each arm containing two holes, one hole through the arm inside the flange and the other hole through the arm on the outside of the flange, a wire or rod fitted through the holes located inside the flange, a head on each end of the wire or rod, a threaded movable bolt with nut and lock spring washer connecting up each pair of arms through the holes outside the flange, all substantially as herein set forth.

2. A combination of a tire attaching means consisting of a series of pairs of movable clamp arms embracing the side flange of a wheel rim, each arm containing two holes, one hole through the arm inside the flange and the other hole through the arm on the outside of the flange, a wire or rod fitted through the holes located inside the flange, a head on each end of the wire or rod, a threaded movable bolt with nut and lock spring washer connecting up each pair of arms through the holes outside the flange, and a rubber and canvas pad connected to the wires or rods and located between the tire and each pair of arms, all substantially as herein set forth.

MARY EDITH BROOKE.

Witnesses:
ELLA FITZPATRICK,
SIDNEY DIRMOCK.

Copies of this patent may be obtained for five cents each, by addressing the "Commissioner of Patents, Washington, D. C."